United States Patent
Cetintas et al.

(10) Patent No.: US 9,607,217 B2
(45) Date of Patent: Mar. 28, 2017

(54) GENERATING PREFERENCE INDICES FOR IMAGE CONTENT

(71) Applicant: Yahoo! Inc., Sunnyvale, CA (US)

(72) Inventors: Suleyman Cetintas, Santa Clara, CA (US); Kuang-chih Lee, Union City, CA (US); Jia Li, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 8 days.

(21) Appl. No.: 14/579,998

(22) Filed: Dec. 22, 2014

(65) Prior Publication Data

US 2016/0180162 A1 Jun. 23, 2016

(51) Int. Cl.
   *G06K 9/00* (2006.01)
   *G06F 3/0484* (2013.01)
   *G06F 17/30* (2006.01)
   *G06K 9/62* (2006.01)

(52) U.S. Cl.
   CPC ..... *G06K 9/00456* (2013.01); *G06F 3/04842* (2013.01); *G06F 17/30265* (2013.01); *G06K 9/00664* (2013.01); *G06K 9/6201* (2013.01)

(58) Field of Classification Search
   None
   See application file for complete search history.

(56) References Cited

U.S. PATENT DOCUMENTS

| | | | | |
|---|---|---|---|---|
| 8,965,112 B1* | 2/2015 | Ibarz | ...... | G06K 9/6256 382/105 |
| 2003/0089218 A1* | 5/2003 | Gang | ...... | G06F 17/30743 84/615 |
| 2006/0161814 A1* | 7/2006 | Wocke | ...... | G06K 9/6251 714/26 |
| 2011/0029914 A1* | 2/2011 | Whitby | ...... | G06T 11/60 715/781 |
| 2011/0038998 A1* | 2/2011 | Kohli | ...... | A47J 31/40 426/433 |

OTHER PUBLICATIONS

Chen, "DeepSentiBank: Visual Sentiment Concept Classification with Deep Convolutional Neural Networks," arXiv:1410.8586v1 [cs.CV] Oct. 30, 2014, 7 Pages.
Krizhevsky, "ImageNet Classification with Deep Convolutional Neural Networks," Oct. 19, 2012, http://papers.nips.cc/paper/4824-imagenet-classification-with-deep-convolutional-neural-networks, 9 Pages.
Krizhevsky, "ImageNet Classification with Deep Convolutional Neural Networks," Oct. 19, 2012, http://papers.nips.cc/paper/4824-imagenet-classification-with-deep-convolutional-neural-networks, 27 Pages.

* cited by examiner

*Primary Examiner* — Ilya Traktovenko
(74) *Attorney, Agent, or Firm* — Berkeley Law & Technology Group, LLP

(57) ABSTRACT

Briefly, embodiments of methods and/or systems of generating preference indices for contiguous portions of digital images are disclosed. For one embodiment, as an example, parameters of a neural network may be developed to generate object labels for digital images. The developed parameters may be transferred to a neural network utilized to generate signal sample value levels corresponding to preference indices for contiguous portions of digital images.

20 Claims, 2 Drawing Sheets

GENERATING PREFERENCE INDICES FOR IMAGE CONTENT

BACKGROUND

1. Field

The present disclosure relates generally to generating and/or providing a preference index with respect to image content, such as at least a portion of an image.

2. Information

At times, such as in advertising, market research, and so forth, it may be useful to have an ability determine in advance how marketing material, for example, may be perceived, such as by a target audience. In an attempt to determine favorability of images and/or other advertising materials, an advertiser, for example, may engage in a control-group study. However, in some instances, efforts such as these may consume significant periods of time and/or financial resources.

BRIEF DESCRIPTION OF DRAWINGS

Claimed subject matter is particularly pointed and/or distinctly claimed in the concluding portion of the specification. However, both as to organization and/or method of operation, together with objects, claimed features, and/or advantages thereof, claimed subject matter may be understood by reference to the following detailed description if read with the accompanying drawings in which:

Figure 1A:
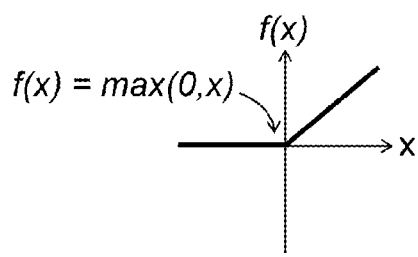
FIGS. 1A and 1B are diagrams showing operations which may be executed by a processor operating a neural network according to an embodiment.

Reference is made in the following detailed description of the accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples or processing portions of a neural network, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of a neural network, in an embodiment. (See, for example Jeffrey Dean et al. "Large Scale Distributed Deep Networks," Advances in Neural Information Processing Systems 25, 2012, pp. 1232-1240.) As mentioned, one non-limiting, but well-known example, is the Hadoop distributed computing system, which refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

It should be understood that for ease of description, a network device (also referred to as a networking device) may be embodied and/or described in terms of a computing device. However, it should further be understood that this description should in no way be construed to imply or suggest that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term "sub-network" and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term "transparent" refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term "Internet Protocol," "IP," and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term "World Wide Web" ("WWW" or "Web") and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term "Hypertext Transfer Protocol," "HTTP," and/or similar terms is intended to refer to any version, now known and/or later developed. It is likewise noted that in various places in this document substitution of the term "Internet" with the term "World Wide Web" (Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, digital image, a contiguous portion of the digital image, just to name a few examples. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms, refer to any electronic file and/or electronic document, such as an electronic digital image, and/or a contiguous portion of an electronic digital image, such as may be accessible via a network, including by specifying a URL for accessibility via the Web, for example. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "index", "preference index", "sentiment index," "document", "electronic document", "content", "digital image", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language).

In another embodiment, an electronic document may comprise a portion or a region of a Web page, a portion, such as a contiguous portion, of a digital image captured using a digital camera. However, claimed subject matter is not intended to be limited in these respects. Also, for one or more embodiments, an electronic document and/or digital image may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or a contiguous portion of digital image, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, and exist in the form of physical signals and/or physical states, such as memory states. For example, one or more parameters, such as parameters of a neural network, may comprise signal sample values utilized in a convolutional filters, signal sample values utilized in one or more kernel masks, response normalization of output signal samples of one or more neurons of a neural network, neuron weighting value levels, size of filters, number of filters, and so forth. Claimed subject matter is intended to embrace meaningful, descriptive parameters in any format, so long as the one or more parameters comprise physical signals.

Signal packets and/or frames, also referred to as signal packet transmissions and/or signal frame transmissions, may be communicated between nodes of a network, and/or among neurons of a neural network, where a node may comprise one or more network devices and/or one or more computing devices, for example. As an illustrative example, but without limitation, a node may comprise one or more sites employing a local network address. Likewise, a device, such as a network device and/or a computing device, may be associated with a computing node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public. A computing network may be very large, such as comprising thousands of nodes, millions of nodes, billions of nodes, or more, as examples.

Media networks, such as the Yahoo!™ network, for example, may be increasingly seeking ways to attract users to their networks and/or to retain users within their networks for extended periods of time. A media network may, for example, comprise an Internet Web site and/or group of Web sites having one or more sections. For instance, the Yahoo!™ network includes Web sites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, a user may beneficially interact with a media network to determine a "preference index" with respect to digital content, such as a contiguous portion of a captured image, for example, which may influence whether a user "posts," for example, an image, or portion thereof, on a user's blog, social network page, etc. (e.g., Tumblr, Flickr, and so forth). In other implementations, a social network user may wish to find images that may be likely to bring about an above-average preference index to assist in viral marketing, for example. In these implementations, and others, assessing whether a user's impression of content, such as a captured image or a contiguous portion thereof, for example, suggests a positive or a negative "preference," again, for example, may be helpful, such as for content to be displayed to an audience. In this context, a "preference index" and/or similar terms refer, at least in part, to a measurement of a feeling and/or an emotion towards displayable content or displayed content, such as a contiguous portion of a digital image. It is further noted, in this context, that a measurement is meant to comprise a measurement with respect to the displayed or displayable content as a whole. Thus, for an entire image, for example, a measurement refers to a measurement as to the entire image as the displayable content is meant to be displayed; likewise, for a contiguous portion (e.g., sub-portion) of an image, a measurement is as to the contiguous portion as a whole, again, as the displayable content is meant to be displayed. Likewise, in this context, displayable or displayed content is understood to imply content capable of being perceived visually; however, a device, for example, may be employed so that content, such as stored content, is rendered in a manner to be visually perceived, whereas content as stored may not necessarily be visually perceivable. Ascertaining a preference index, may comprise, among other things, one or more signal samples measurements of a user's sentiment, which may be helpful in assessing, in advance, an audience's response, for example.

In one or more embodiments, a "preference index" may be expressed using a numerical scale, such as a scale allowing discrete, integer-valued incremental levels, from, for example, −2.0 to +2.0. In an embodiment, a preference index comprising a signal sample value level of −2.0 may at least approximately indicate that an image, or contiguous portion thereof, for example, may be more likely to evoke a substantially negative preference for an individual viewing it. In an embodiment, a preference index comprising a signal sample value level of +2.0 may indicate an image, or contiguous portion thereof, for example, may at least approximately be more likely to evoke a substantially positive preference for an individual viewing it. Preference indices comprising signal sample value levels of −1.0, 0.0, and +1.0 respectively may indicate an image that may at least approximately be more likely to evoke a relatively mild negative preference, a relatively neutral preference, and a relatively mild positive preference, for example. Thus, as implied, a preference index may include the opposite of being preferred, for example, such as a negative preference. It is noted that, as implied from the foregoing, a scale, such as the foregoing illustrative example, is understood to be approximate and to be ordinal.

In certain embodiments, a preference index with respect to displayable digital content, such as a contiguous portion of captured image, for example, may include, at least in part, a relative likelihood of evoking positive sentiments, negative sentiments, or neutral sentiments, such as responsive to a user viewing the particular content. However, in certain embodiments, in addition, a preference index may likewise further comprise a host of possible additional perceived qualities and/or attributes with respect to displayable content in addition to (e.g., in conjunction with) "sentiment" per se. Accordingly, a preference index may comprise a signal sample measurement corresponding to sentiment along with, just to name a few possible examples, whether particular content may be perceived, relatively speaking, as "expensive" or "inexpensive", as "healthy" or "unhealthy," "old" or "new," and so forth. Accordingly, although likelihood of evoking a particular sentiment and/or range of sentiments may be utilized to generate a signal sample measurement for a preference index, claimed subject matter is intended to embrace a wide range of additional contributors along with sentiment.

In certain embodiments, a preference index may furthermore be expressed utilizing scales other than integer-valued incremental levels, such as including levels other than signal sample integer-valued levels. For example, particular embodiments may involve generation of signal sample value levels for a preference index approximately in a range of approximately −1.0 to approximately +1.0 (e.g., a signal sample value level of approximately −1.0 indicates a negative preference and a signal sample value level of approximately +1.0 indicates a positive preference). Additionally, signal sample value levels of a preference index may be expressed utilizing decimal-valued levels, such as −1.1, −0.9, and so forth, in which, for example, larger negative decimal-valued levels may indicate a stronger negative preference, and in which, for example, larger positive decimal value levels may indicate a stronger positive preference. Further, signal sample value levels of a preference index may be expressed utilizing a group of characters, such as, for example, alphabetical characters, e.g., "A," "B," "C," "D," "E," in which "A," may indicate a relatively strong positive preference, and "E," may indicate a relatively strong preference, for example, or vice versa. Accordingly, it should be noted that any number of indicator types may be used to express signal sample value levels of a preference index, such as whole-numbered value levels, integer-valued levels, decimal-valued levels, rational-numbered value levels, alphabetically-valued levels, or other schemes for assigning value levels to preference indices, or combinations thereof. Thus, claimed subject matter is not intended to be limited in this respect. As above, it is noted here that a scale for an index, such these illustrative examples, are understood to be approximate and to be ordinal.

Typically, training via a classifier, such as a machine learning classifier (which may comprise, for example, a support vector machine (SVM)), for example, to generate a preference index, for example, in general, may be complex and/or time intensive. For example, measurements for a large sample of digital content would typically be employed. Thus, measurements would be gathered and stored. Ground truth would also typically be employed, meaning verification using a sample set where it is believed that reasonably correct measurements exist. Thus, in addition to time and cost, computational and/or memory resources may be consumed in connection with implementation and validation. An approach to generate similar results with less effort and/or complexity may employ a neural network, however, may include, for example a neural such as that described by Krizhevsky et al, "ImageNet Classification with Deep Convolutional Neural Networks," Advances in Neural Information Processing Systems 25 (NIPS 2012).

In certain embodiments, a neural network, which may comprise, for example, a network of "neurons," may be employed to generate signal sample values for preference indices of contiguous portions of digital images. A neural network may comprise, for example, dozens, hundreds, thousands, or a greater number of neurons, which may produce and/or generate one or more output signal samples as a function of one or more input signal samples, for example. Thus, a neuron of a neural network, in an embodiment, may generate an output signal sample, such as f(x), responsive to one or more input signal samples, such as $f(z_1)$, $f(z_2)$, $f(z_3)$, and so forth. In particular embodiments, neurons of a neural network may generate, for example, an output signal sample responsive to executing a weighted superposition (e.g., summing) operation utilizing input signal samples $f(z_1)$, $f(z_2)$, and $f(z_3)$, such as shown in expression 1 below:

$$f(x)=w_1 f(z_1)+w_2 f(z_2)+w_3 f(z_3) \qquad (1)$$

In expression 1, weights $w_1$, $w_2$, and $w_3$, may comprise, for example, a value level approximately in the range of approximately 0.0 to approximately 1.0.

Thus, in an embodiment, rather than training a large sample set of digital content, in effect, instead, a sample set employed to generate a neural network, here and typically, a large sample, may be leveraged, such as to generate a preference index, for example. In an embodiment as an illustration, at a high level, a neural network is developed for digital content using a large number of images and/or portions thereof, for example, to perform image classification. Likewise, a relatively small sample of digital images may be employed to generate preference indices. In this example, using the relatively small sample of digital images (at least in comparison with the sample used to generate the neural network), a neural network may be employed to generate neural network signal samples. It is noted that modifications may be made to processing of the neural network to generate signal samples for use with preference indexing. However, these signal samples and preference indices measurements for the relatively small sample of digital images may be employed to train one or more classifiers, such as, for example, a machine learning classifier in an embodiment; however, likewise, other types of processing may also be employed for the neural network generated signal samples and the reference indices measurements, as described later. Leveraging a neural network in this manner in this context is referred to as transfer learning.

A neural network may, in an embodiment, be implemented using one or more sets of executable instructions capable of being executed by one or more accessible computing devices, for example, which may operate using physical signals and/or physical states, such as physical states corresponding to non-transitory physical memory states, for example. It is noted that the term signal samples and/or similar terms throughout this patent application are understood to refer to physical signals and/or physical states, such as physical states corresponding to non-transitory physical memory states. A neural network may comprise, for example, one or more input signal layers, which may refer to one or more network layers to receive and/or access input signal samples. A neural network may additionally comprise one or more output signal layers, which may refer to a network layer that generates observable output signal samples, such as in the form of an output parameter file, which may be accessible by one or more sets of computer-executable instructions, such as operating external to the neural network, for example. A neural network may further comprise one or more "hidden" layers, which may refer to one or more layers of a neural network to perform signal processing. It is noted that a distributed computing system may, in some cases, may be employed, but is generally not required.

In certain embodiments, a neural network may, for example, involve use of one or more convolutional filtering layers, in which input signal samples, which may comprise a digital image or a contiguous portion of a digital image, may be convolved with one or more kernel operations in which the one or more kernel operations specify, in effect, digital signal processing of the content being processed, in this example. In particular embodiments, convolutional filtering may be executed using sub-regions of a contiguous portion of a captured digital image, for example. In particular embodiments, a neural network may comprise, for example, five successive convolutional filtering layers, in which, as described in greater detail below, may operate utilizing signal samples from previous convolutional filtering layers. Of course, it is understood that any neural network may be employed and claimed subject matter is not limited in scope to the particulars of the illustrative example provided.

In certain embodiments, signal samples may undergo various stages of signal processing, such as in connection with processing by a neural network, including, for example, nonlinear filtering and/or max-pooling, which may, in an embodiment, take place prior to signal samples being processed by a convolutional filtering layer, after signal samples are generated by a convolutional layer, and/or during signal processing by a convolutional layer, for example. As shown in FIG. 1A, in an embodiment 100, nonlinear filtering of signal samples from a convolutional filtering layer may involve use of rectification. In general, rectification and/or similar terms, in this context, are understood to refer to permitting a signal in one direction but not an opposing direction. In this context, therefore, negative signals are cut off or truncated while positive signals are permitted or passed through. For a signal sample x, for example, rectification may be described as being substantially in accordance with max(0,x). However, in other embodiments, filtering of signal samples may involve filtering using other linear and/or nonlinear approaches, which may operate in place of or in addition to rectification. Thus, claimed subject matter is not limited in scope in this respect.

Figure 1B:
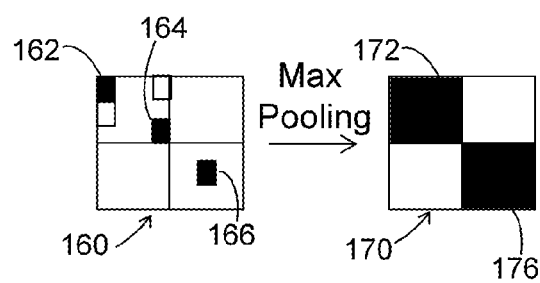

Likewise, as illustrated in FIG. 1B, in an embodiment 150, signal samples, such as, for example, from convolutional filtering layer 160, as an illustrative example, may undergo max-pooling in convolutional filtering layer 170. In this context, max-pooling and/or similar terms refer to a type of nonlinear down-sampling in which signal samples corresponding to a portion of an image may be partitioned into sub-regions comprising one or more non-overlapping rectangles, for example. In one non-limiting example, such as FIG. 1B, signal sample values of a sub-region from a convolutional filtering layer, such as signal sample values 162 and 164 of layer 160, may be "pooled" into, for example, a signal sample value, such as signal sample value 172 of layer 170. Likewise, signal sample value 166 of convolutional filtering layer 160 may be pooled to form signal sample value 176 of convolutional filtering layer 170. Thus, in this illustrative example, in layer 170, a sub-region takes as its value a maximum value of the corresponding sub-region of layer 160.

In some embodiments, successive convolutional filtering layers may execute image processing of signal sample values which may, for example, correspond to a contiguous portion of a captured image. Signal samples generated at one convolutional filtering layer may comprise signal samples for use by another filtering layer, such as of a neural network. Thus, in this context, the term fully-connected filtering layers of a neural network and/or similar terms refers to substantially all neurons of a previous layer coupling to all neurons of a subsequent layer. However, it should be noted that this is but one way of arranging neurons, and claimed subject matter is not limited in this respect. In particular embodiments, such an arrangement may permit processing of substantially all signal sample outputs from a previous fully-connected layer by one or more subsequent fully-connected layers, for example. R As mentioned previously, in an embodiment, a neural network may be developed, such as to perform image classification. In particular embodiments, thousands, hundreds of thousands, millions, or a greater number of samples of image content may be utilized. In one or more embodiments, a neural network comprising five convolutional filtering layers and three connected layers may comprise approximately 650,000 neurons, which may utilize approximately 60,000,000 parameters. In one possible example, as will be described with reference to FIG. 2, a neural network may perform image classification. Thus, input signal samples from an image corresponding to a zebra may generate an appropriate object label. A neural network may, thus, label input signal samples corresponding to a large variety of other types of images, and claimed subject matter is not limited in this respect. (See, for example, Krizhevsky et al., discussed previously, supra.)

A neural network utilized to generate signal sample values corresponding to image object labels for captured images may likewise be employed to generate preference indices for digital content substantially in accordance with transfer learning. Thus, for a sample of digital content, preference indices may be compiled and neural network signal samples may be generated. As mentioned previously, in an embodiment, modifications may be made to processing by a neural network to generate signal samples for use with preference indexing. Accordingly, signal samples generated by a neural network to correspond to the sample of digital content for which preference indices have been compiled may permit generation of a preference index for digital content not included in the sample. As previously described, such a capability may have a variety of uses, such as, for example, determining whether a user should "post," for example, an image on a user's blog or social network page. In another example, determining a preference index for digital content may assist in viral marketing, or may be helpful in personalizing content to be displayed to an audience, just to name a few examples.

Figure 2:
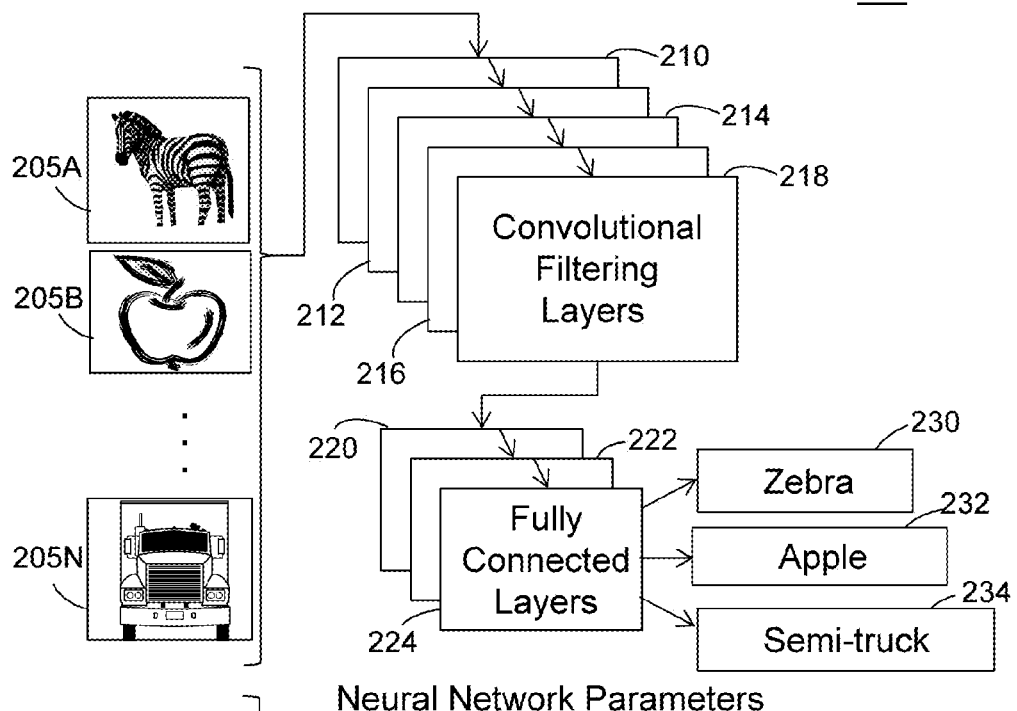
FIG. 2 is a schematic diagram of a neural network, which may operate according to an embodiment.
Figure 2:
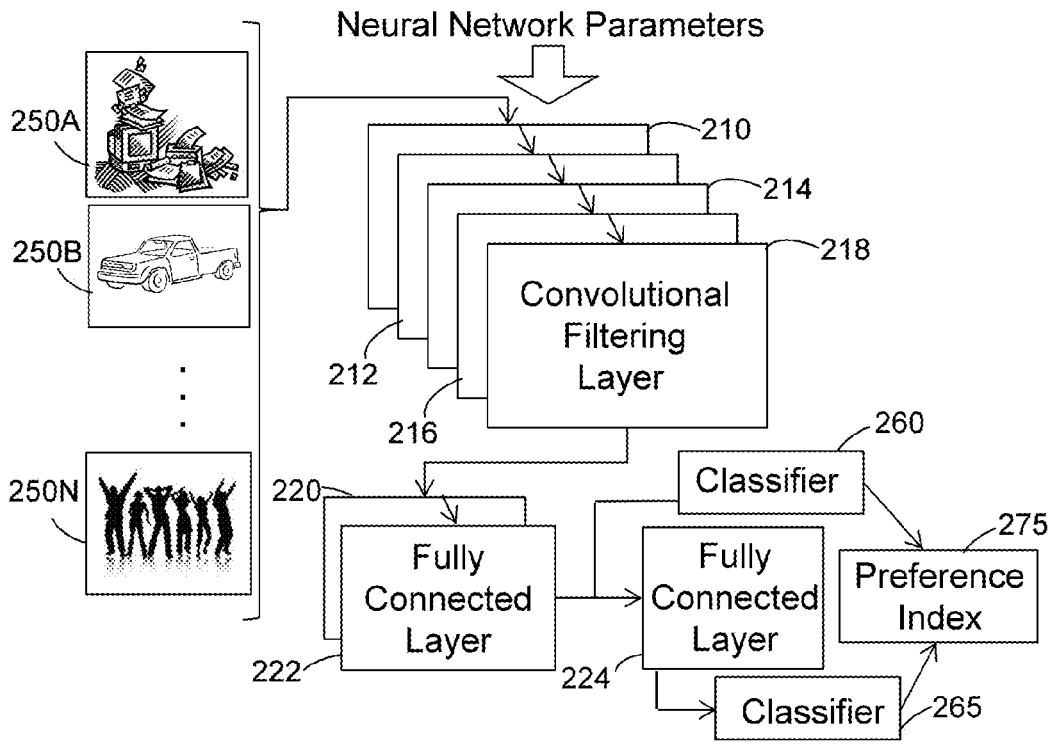

FIG. 2 is a schematic diagram of a neural network, which may operate substantially according to an embodiment 200. Although two distinct neural networks are identified in FIG. 2, this is for the convenience of explanation. In implementation, typically one neural network, perhaps even selected sub-portions thereof, may be employed. Nonetheless, continuing with this illustrative example, in at least some embodiments, a first digital image group, which may comprise digital images 205A, 205B, . . . , 205N may differ from a second digital image group, which may comprise digital images 250A, 250B, . . . , 250N.

In the embodiment of FIG. 2, a first digital image group may be used to develop a neural network to generate signal sample values corresponding to one or more object labels for a digital image, previously discussed as image classification. Thus, neural network parameters, such as described below, may subsequently be used by a neural network to generate signal sample values corresponding to one or more preference indices for a digital image, for example. As mentioned, some modifications may be made, if appropriate, to the developed neural network processing, since, here, for example, image classification is not the same as generating a preference index.

It should also be noted that in particular embodiments, generation of signal sample values corresponding to preference indices for digital images may be performed in a term-independent manner, which refers to generating a preference index for digital content, such as a contiguous portion of a digital image, independent of language. For example, in one or more embodiments, a digital image, for example, may comprise an abstract shape, which may not easily conform to a description as one or more terms of a given language. In another example, a digital image, for example, may comprise two or more discernible shapes present in a single image. As mentioned previously, generation of a preference index in such a case would be for the image as a whole in this example, rather than for the independent objects. It should further be noted that employing trained neural network parameters to accomplish transfer learning may bring about additional benefits, which may be utilized for other purposes, in addition to or in place of generating preference indices, and claimed subject matter is not limited in this respect.

Returning to FIG. 2, in certain embodiments, a neural network may employ convolutional filtering layers, such as convolutional filtering layers 210, 212, 214, 216, and 218. A neural network may additionally employ fully-connected layers, such as fully-connected layers 220, 222, and 224. In particular embodiments, a convolutional neural network, such as shown in FIG. 2, may be described as a "deep" convolutional neural network. A deep convolutional neural network refers to a neural network in which signal samples from one or more convolutional filtering layers, such as convolutional filtering layer 210, are used to provide signal samples to one or more other convolutional filtering layers, such as layer 212, for example, and/or one or more fully-connected layers, such as fully-connected layer 220. In the embodiment of FIG. 2, digital images of a first digital image group, which may comprise digital images 205A, 205B, . . . , 205N, may be divided into red-green-blue (RGB) sub-regions. In certain embodiments, substantially square sub-regions of a digital image may be employed, which may encompass areas of approximately 224 pixels by approximately 224 pixels, for example, although claimed subject matter is intended to embrace sub-regions of virtually any number of pixels arranged in any number of shapes. In particular embodiments, convolutional filtering layer 210, for example, may convolve one or more sub-regions with one or more image processing kernel operations, which may permit, for example, signal processing with respect to features of a sub-region. Convolutional filtering layers 212, 214, 216, or 218, for example, may convolve signal samples of a previous convolutional filtering layer with one or more image processing kernels.

In certain embodiments, signal samples of one or more convolutional filtering layers 210-218 may be filtered using rectification, an example of which is provided in FIG. 1. In particular embodiments, use of a rectification operation may beneficially assist in training, in an embodiment. It should be noted that although use of rectification may in some situations be beneficial, other types of linear/nonlinear filtering may be utilized, and claimed subject matter is not limited in any particular filtering approach. Signal samples from one or more of convolutional filtering layers 210, 212, 214, 216, and 218 may additionally be pooled using, for example, a max-pooling approach, an example of which is provided at FIG. 1B, which, as previously noted, may refer to a type of nonlinear down-sampling in which signal samples corresponding to a portion of an image may be pooled into, for example, a signal sample value level, such as a single, maximum signal sample value level for the image portion. In particular embodiments, filtered and max-pooled signal samples, after being generated by a layer, may be utilized by one or more additional convolutional filtering layers, such as previously described, for example.

In FIG. 2, images 205A, . . . , 205N may comprise any number of contiguous images, such as an image of a zebra (205A), apple (205B), and a semi-truck (205C). In an embodiment, images 205A, . . . , 205N may comprise a training set of more than 1,000,000 images, which may be used, for example, to develop a neural network of 60,000,000 parameters of a 650,000-neuron neural network. (See, for example, Krizhevsky et al., discussed previously, supra.) In one non-limiting embodiment, just to illustrate, convolutional filtering layers 210, 212, 214, 216, and 218 may comprise 253,440 neurons, 186,624 neurons, 64,896 neurons, 64,896 neurons, and 43,264 neurons, respectively, although claimed subject matter is not limited to this illustrative example. Thus, more or fewer neurons, for example, may be employed in a neural network. In an embodiment, such as shown in FIG. 2, for example, subsequent to convolving operations executed by convolutional filtering layers, signal samples from, for example, convolutional filtering layer 218 may be used as signal samples to be process by fully-connected layers 220, 222, and 224. In one non-limiting embodiment, just to illustrate, fully-connected layers 220, 222, and 224 may comprise 4096 neurons, 4096 neurons, and 1000 neurons, respectively, although, again, claimed subject matter is not limited to this illustrative example. In the particular embodiment of FIG. 2, object labels may comprise, for example, object label 230, which may correspond to the zebra of digital image 205A, object label 232, which may correspond to the apple of digital image 205B, and/or object label 234, which may correspond to the semi-truck of digital image 205C. Thus, initially a neural network may be trained, such as via a multinomial logistic regression objective, which may implement back propagation by way of stochastic gradient descent, for example.

In an embodiment, however, as shown in FIG. 2, parameters of a convolutional neural network may be transferred substantially in accordance with transfer learning. Responsive to training of a convolutional neural network to perform image classification for digital images, such as digital images 205A, 205B, and so forth, parameters may be developed and then transferred to a neural network utilized to provide signal sample values corresponding to preference indices for digital images, such as digital images 250A, 250B, . . . , 250N.

In an embodiment, digital images 250A, 250B, . . . , 250N comprise a set of digital images, which may number into the thousands, millions, and so forth. However, in at least some embodiments, digital images 250A, 250B, . . . , 250N may also comprise a much smaller-sized group of digital images, such as less than 200, for example. In the embodiment of FIG. 2, parameters developed (e.g., via training) for use convolutional filtering layers 210, 212, 214, 216, and 218 to execute image object labeling may, at least in some embodiments, likewise be employed with convolutional filtering layers of a neural network for use in generating preference indices.

In an embodiment, as mentioned, fully-connected layers 220, 222, and 224, may undergo certain adjustments to be utilized in a neural network to generate signal sample values corresponding to preference indices. For example, in a particular embodiment, fully-connected layer 222 may provide signal samples for use with a classifier, for example. In one possible embodiment, fully-connected layer 222 may generate a 4096 dimension signal sample vector characterization of an image. Thus, a classifier 260 may be trained using the image set 250A, 250B, etc., in which the preference indices of the image set are trained with the layer 222 signal sample vector characterization. Similarly, fully-connected layer 224 may produce a 1000 dimension signal sample vector characterization. Thus, a classifier 265 may be trained using the image set 250A, 250B, etc., in which preference indices of the image set are trained with the layer 224 signal sample vector characterization. It should be noted that, in an embodiment, additional variations in architecture of a neural network may be implemented, and claimed subject matter is not limited in this respect.

In certain embodiments, as mentioned, classifiers 260 and 265, for example, may be trained using a digital image sample set in which preference indices are trained using signal sample vectors generated by layers 222 and 224, respectively. Thus, to generate a preference index for digital content other than the training digital images, signal sample vector characterizations of an image, or a contiguous portion thereof may be generated via a neural network and provided to classifiers, in an embodiment.

Figure 3:
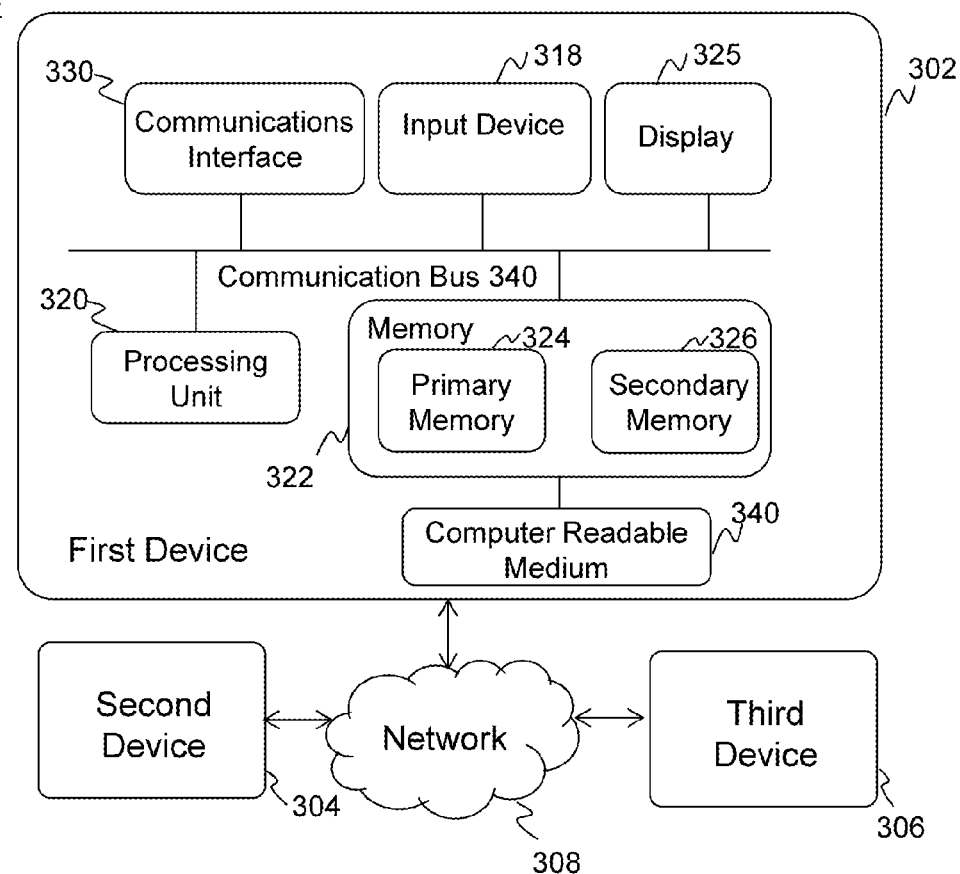
FIG. 3 is a schematic diagram of a computing platform according to an embodiment.

For purposes of illustration, FIG. 3 is an illustration of an embodiment of a system 300 that may be employed in a client-server type interaction, such as described infra. in connection with rendering a GUI via a device, such as a network device and/or a computing device, for example. In FIG. 3, computing device 302 ('first device' in figure) may interface with client 304 ('second device' in figure), which may comprise features of a client computing device, for example. Communications interface 330, processor (e.g., processing unit) 320, and memory 322, which may comprise primary memory 324 and secondary memory 326, may communicate by way of a communication bus, for example. In FIG. 3, client computing device 302 may represent one or more sources of analog, uncompressed digital, lossless compressed digital, and/or lossy compressed digital formats for content of various types, such as video, imaging, text, audio, etc. in the form physical states and/or signals, for example. Client computing device 302 may communicate with computing device 304 by way of a connection, such as an internet connection, via network 308, for example. Although computing device 302 of FIG. 3 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 320 may be representative of one or more circuits, such as digital circuits, to execute at least a portion of a computing procedure and/or process. By way of example, but not limitation, processor 320 may comprise one or more processors, such as controllers, microprocessors, microcontrollers, application specific integrated circuits, digital signal processors, programmable logic devices, field programmable gate arrays, the like, or any combination thereof. In implementations, processor 320 may execute signal processing to manipulate signals and/or states, to construct signals and/or states, etc., for example.

Memory 322 may be representative of any storage mechanism. Memory 322 may comprise, for example, primary memory 324 and secondary memory 326, additional memory circuits, mechanisms, or combinations thereof may be used. Memory 322 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 322 may be utilized to store a program. Memory 322 may also comprise a memory controller (not shown in FIG. 3) for accessing computer readable-medium 340 that may carry and/or make accessible content, which may include code, and/or instructions, for example, executable by processor 320 and/or some other unit, such as a controller and/or processor, capable of executing instructions, for example.

Under direction of processor 320, memory, such as memory cells storing physical states, representing, for example, a program, may be executed by processor 320 and generated signals may be transmitted via the Internet, for example. Processor 320 may also receive digitally-encoded signals from client computing device 302.

Network 308 may comprise one or more network communication links, processes, services, applications and/or resources to support exchanging communication signals between a client computing device, such as 302, and computing device 306 ('third device' in figure), which may, for example, comprise one or more servers (not shown). By way of example, but not limitation, network 308 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 302, as depicted in FIG. 3, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 322 may store cookies relating to one or more users and may also comprise a computer-readable medium that may carry and/or make accessible content, including code and/or instructions, for example, executable by processor 320 and/or some other unit, such as a controller and/or processor, capable of executing instructions, for example. A user may make use of input device 318, such as a computer mouse, stylus, track ball, keyboard, and/or any other similar device capable of receiving user actions and/or motions as input signals. Likewise, a user may make use of an output device, such as display 325, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of generating preference indices for image content utilizing one or more special-purpose computing devices to operate as a neural network and as another neural network, to operate without further human intervention, in which the one or more special-purpose computing devices includes one or more processors and one or more memory devices, comprising:
accessing computer instructions from the one or more memory devices of the one or more special-purpose computing devices for execution on the one or more processors of the one or more special-purpose computing devices;
executing the accessed computer instructions utilizing the one or more computing devices; and
storing, in the one or more memory devices of the one or more special-purpose computing devices, any results of having executed the accessed computer instructions on the one or more processors of the one or more special-purpose computing devices, wherein
the computer instructions to be executed comprise instructions for generating a term-independent preference index for a contiguous portion of an image using the another neural network, the another neural network including neural network parameters developed for the neural network to identify one or more object labels for a captured image, the another neural network including at least one classifier, not present in the neural network, to receive signal sample values from one or more fully-connected layers of the another neural network and to generate signal sample values corresponding to the preference indices based, at least in part, on the at least one classifier.

2. The method of claim 1, wherein the term-independent preference index comprises a sentiment index.

3. The method of claim 1, wherein the term-independent preference index comprises an odd number of allowed value levels.

4. The method of claim 1, wherein the another neural network comprises a convolutional neural network.

5. The method of claim 4, wherein the convolutional neural network comprises a deep convolutional neural network.

6. The method of claim 1, wherein the neural network parameters developed for the another neural network are transferred from the neural network.

7. The method of claim 1, wherein the generating the term-independent preference index includes generating the term-independent preference index via classification of signal samples generated by one or more convolutional layers of the another neural network.

8. The method of claim 7, wherein the classification comprises classification via a machine learning process.

9. The method of claim 8, wherein the machine learning process comprises a support vector machine process.

10. The method of claim 7, wherein the classification comprises classification via a regression process.

11. An apparatus, comprising:
one or more special-purpose computing devices to operate as a neural network and as another neural network, the one or more special-purpose computing devices including one or more processors and one or more memory devices, to execute computer instructions on the one or more processors, without further human intervention, the computer instructions to be executed having been accessed from the one or more memory devices for execution on the one or more processors, the one or more special-purpose computing devices to store in the one or more memory devices any results to be generated from the execution of the computer instructions on the one or more processors;
the computer instructions to be executed comprising instructions for execution of generating preference indices for image content, wherein
the computer instructions to be executed by the one or more special-purpose computing devices further to comprise instructions to:
generate a term-independent preference index for a contiguous portion of an image using the another neural network, the another neural network to access neural network parameters developed for the neural network to identify one or more object labels for a captured image, the another neural network including at least one classifier, not present in the neural network, to receive signal sample values from one or more fully-connected layers of the another neural network and to generate signal sample values corresponding to the preference indices based, at least in part, on the at least one classifier.

12. The apparatus of claim 11, the term-independent preference index is to comprise a sentiment index.

13. The apparatus of claim 11, wherein the term-independent preference index is to comprise an odd number of allowed value levels.

14. The apparatus of claim 11, wherein the another neural network is to comprise a deep convolutional neural network.

15. The apparatus of claim 11, wherein the term-independent preference index is to be generated via classification of signal samples generated by one or more convolutional layers of the another neural network.

16. The apparatus of claim 11, wherein the term-independent preference index is to be generated via classification of signal samples generated by one or more convolutional layers of the another neural network via a machine learning process.

17. An apparatus to generate a term-independent preference index for image content utilizing one or more special-purpose computing devices configured as a neural network and as another neural network, to operate without further human intervention, in which the one or more special-purpose computing devices includes one or more processors and one or more memory devices, comprising:
means for accessing computer instructions from the one or more memory devices of the one or more special-purpose computing devices for execution on the one or more processors of the one or more special-purpose computing devices;
means for executing the accessed computer instructions utilizing the one or more computing devices;
means for storing, in the one or more memory devices of the one or more special-purpose computing devices, any results of having executed the accessed computer instructions on the one or more processors of the one or more special-purpose computing devices; and
means for utilizing developed for the neural network, the neural network to identify one or more object labels for a captured image, to generate term-independent preference indices using the another neural network, the another neural network including at least one classifier, not present in the neural network, to receive signal sample values from one or more fully-connected layers of the another neural network and to generate signal sample values corresponding to the preference indices based, at least in part, on the at least one classifier.

18. The apparatus of claim 17, further comprising means for classifying signal samples generated by one or more convolutional layers of the neural network.

19. The apparatus of claim 18, wherein the means for classifying the signal samples comprises means for classifying via a machine learning process.

20. The apparatus of claim 17, further comprising means for generating an odd number of allowed value levels.

* * * * *